(12) United States Patent
Gimmerstam et al.

(10) Patent No.: US 7,921,983 B2
(45) Date of Patent: Apr. 12, 2011

(54) APPARATUS FOR MARSHALLING OBJECTS ON A DRIVEN CONVEYOR

(75) Inventors: Torsten Gimmerstam, Everöd (SE); Lennart Olsson, Hjärup (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 83 days.

(21) Appl. No.: 12/444,177

(22) PCT Filed: Nov. 1, 2007

(86) PCT No.: PCT/SE2007/000977
§ 371 (c)(1),
(2), (4) Date: Apr. 3, 2009

(87) PCT Pub. No.: WO2008/054299
PCT Pub. Date: May 8, 2008

(65) Prior Publication Data
US 2010/0101918 A1 Apr. 29, 2010

(30) Foreign Application Priority Data
Nov. 3, 2006 (SE) ...................................... 0602330

(51) Int. Cl.
*B65G 47/26* (2006.01)
(52) U.S. Cl. ................... 198/419.1; 198/418.7; 198/426
(58) Field of Classification Search ............... 198/459.6, 198/463.3, 592, 861.5, 418.7, 419.1, 426, 198/429
See application file for complete search history.

(56) References Cited

U.S. PATENT DOCUMENTS

| | | | | |
|---|---|---|---|---|
| 3,407,916 A | * | 10/1968 | Engeler | 198/429 |
| 3,464,481 A | * | 9/1969 | Hartzell, Jr. | 198/426 |
| 3,700,090 A | | 10/1972 | Pearson | |
| 3,830,358 A | | 8/1974 | Desantis | |
| 4,148,391 A | | 4/1979 | Stobb | |
| 4,249,847 A | * | 2/1981 | Tokuno | 198/407 |
| 4,610,346 A | * | 9/1986 | Phillipson | 198/419.1 |
| 5,213,189 A | * | 5/1993 | Agnoff | 198/459.6 |
| 5,341,911 A | | 8/1994 | Gamberini et al. | |
| 6,152,286 A | | 11/2000 | Pienta | |
| 6,508,352 B1 | * | 1/2003 | Enenkel et al. | 198/419.1 |
| 6,868,958 B2 | * | 3/2005 | Betti et al. | 198/418.7 |
| 6,953,113 B2 | * | 10/2005 | Iwasa et al. | 198/419.1 |
| 7,198,146 B2 | * | 4/2007 | Guidetti | 198/418.7 |

OTHER PUBLICATIONS

Form PCT/ISA/210 (International Search Report) dated Feb. 15, 2008.

* cited by examiner

*Primary Examiner* — James R Bidwell
(74) *Attorney, Agent, or Firm* — Buchanan Ingersoll & Rooney PC

(57) ABSTRACT

The invention relates to an apparatus for marshalling objects into groups on a single, driven conveyor. The conveyor has two end rollers and at least one deflector roller positioned at the lower part of the conveyor. The apparatus also includes an end stop positioned at the one end roller of the conveyor as well as a stop plate disposed to move up and down, at 90° in relation to the conveyor. The conveyor further has a deflection point placed at the upper part of the conveyor. The conveyor is disposed to be slanted downwards from this deflection point in that the end roller is moved downwards.

7 Claims, 3 Drawing Sheets

Figure 1:
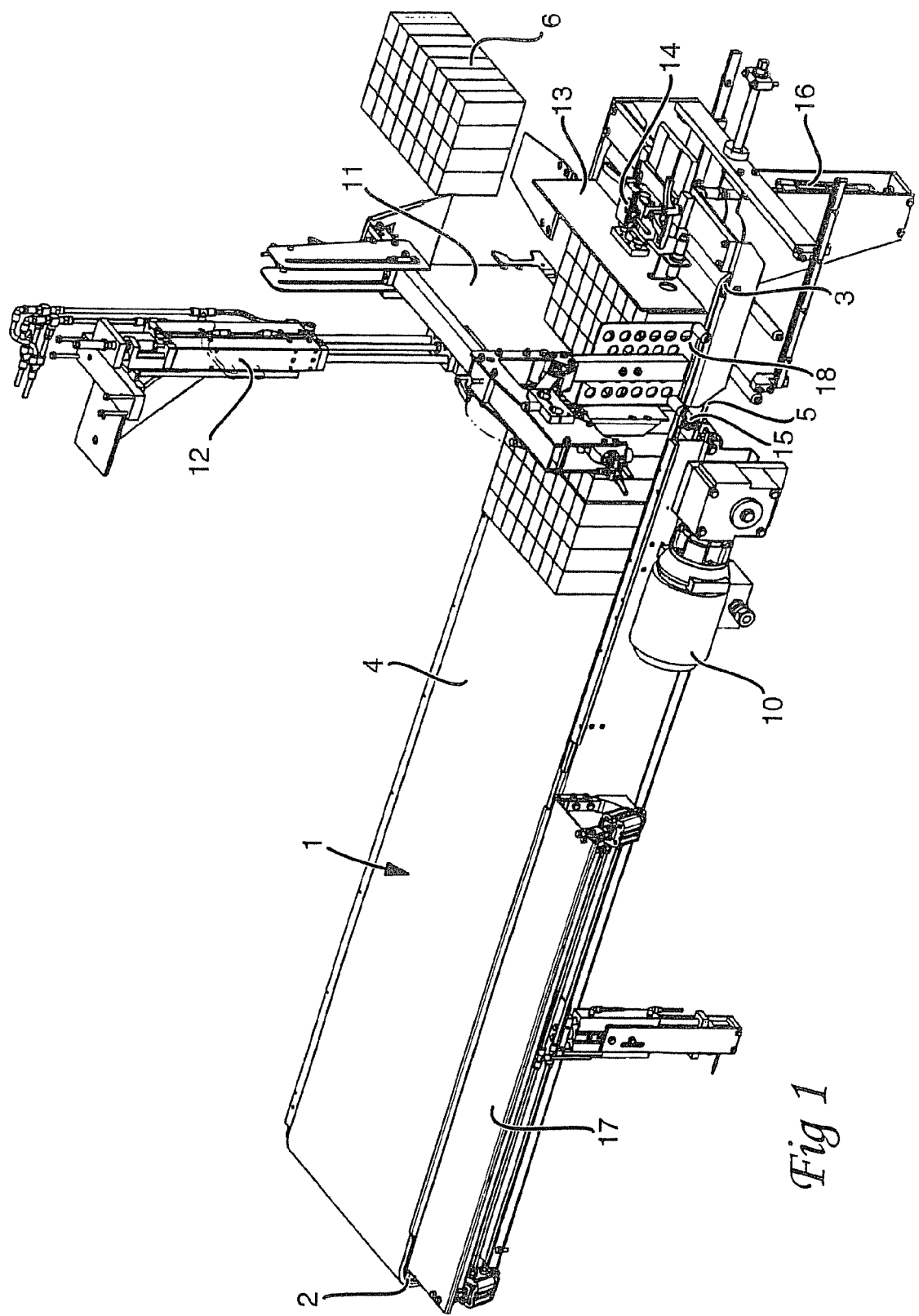

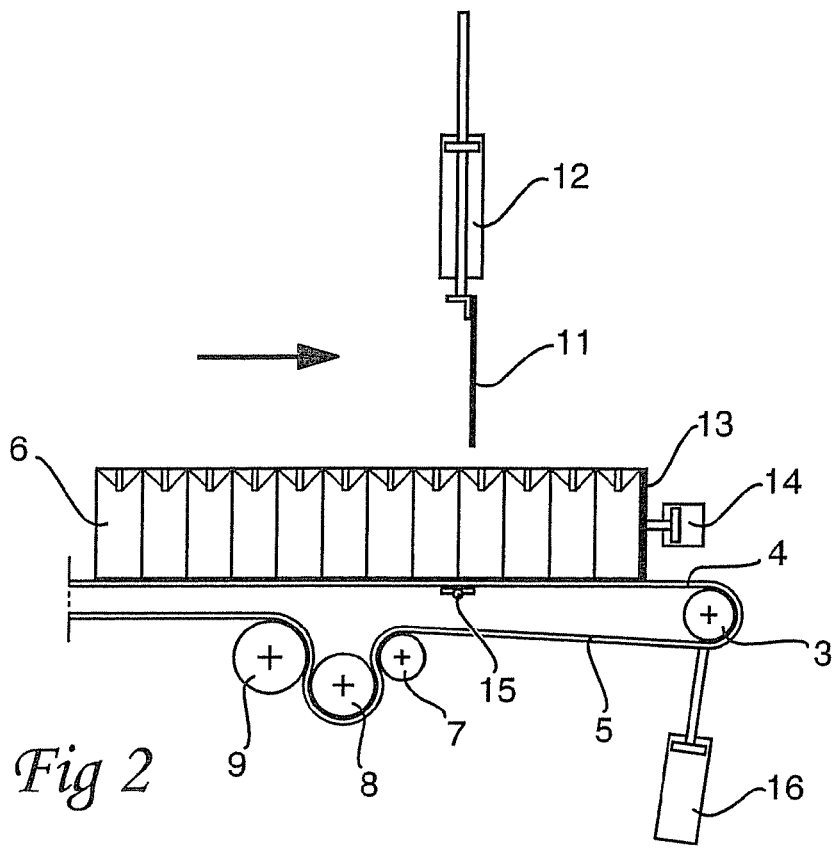
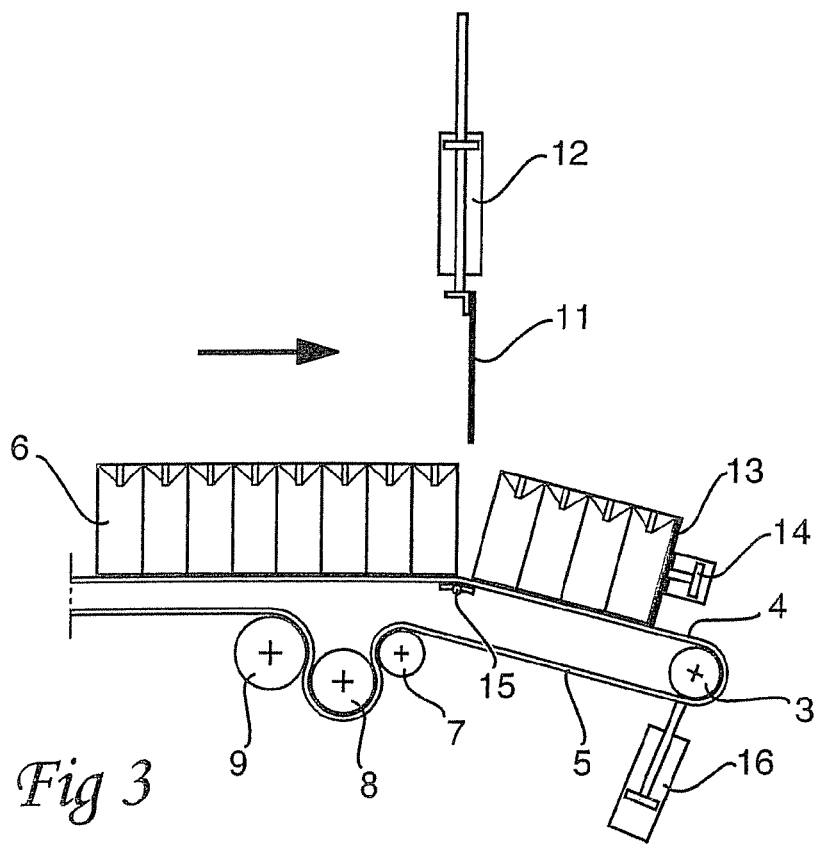

APPARATUS FOR MARSHALLING OBJECTS ON A DRIVEN CONVEYOR

TECHNICAL FIELD

The present invention relates to an apparatus for marshalling objects in a group on a single, driven conveyor, the conveyor having two end rollers and the apparatus comprising an end stop positioned at the one end roller, as well as a stop plate disposed to move up and down, at 90° in relation to the conveyor.

The present invention also relates to a method of marshalling objects in a group on a single, driven conveyor, where the objects are advanced towards an end stop positioned at the one end roller of the conveyor, whereafter a stop plate moves at 90° down to the conveyor and separates off a group of objects.

BACKGROUND ART

In the distribution of different objects, it is occasionally desirable to combine a given number of objects to form a so-called distribution unit. The distribution unit may be held together in different ways. For example, the combined objects may be shrink film-wrapped, provided with a wrapping of paper or cardboard or by other means held together as a unit. Also as regards the manufacture of single-use disposable packages for foods, it is often desirable, in particular in relation to packages of smaller volume, to combine them into distribution units.

The single-use disposable packages may be manufactured from a paper laminate or alternatively from plastic and may have different shapes. One commonly occurring packaging shape is parallelepipedic. The packages are manufactured in a filling machine from a continuous material web, where the material web is formed into a product tube, filled with product and severed to foam individual packaging containers which are thereafter finally formed. The finished packaging containers depart from the filling machine, normally on a conventional conveyor belt.

There are many ways of combining a given number of objects, such as packaging containers, before, in a specially designed machine, they are in some way wrapped into a distribution unit. The commonest method is, from one or more rows of packages, to cause the packages to pass from a first conveyor to a second conveyor, where the second conveyor runs at a higher speed than the first, or alternatively the first conveyor is stopped so that a gap is thereby created between the groups of packages.

One problem inherent in the above-outlined solution is the transition between the two conveyors. In order to remedy this problem, for example a small driven roller has been positioned between the conveyors in order, by such means, to facilitate the transition. But for packages displaying a small bottom surface and packages with a high point of gravity, this has not always been sufficient for the packages to be able to stand in position in their packing pattern without jamming or toppling over. Alternatively, a transition plate may be positioned between the conveyors, but this arrangement may also, for certain package sizes, give rise to problems in that no distinct gap is obtained between the packaging groups.

OBJECTS OF THE INVENTION

One object of the present invention is to realise an apparatus which marshals in a group one or more rows of objects advanced on a conveyor, without the objects being disrupted or toppling over during the marshalling into groups.

A further object of the present invention is to realise an exact and reliable marshalling in a group without using monitoring, for example in the form of photocells or the like.

SOLUTION

These and other objects have been attained according to the present invention in that the apparatus of the type described by way of introduction has been given the characterising feature that the conveyor has at least one deflector roller positioned at the lower part of the conveyor, a deflection point positioned at the upper part of the conveyor, and that the one end roller is disposed to be moved so that a part of the conveyor may be slanted downwards from the deflection point.

These and other objects have further been attained according to the present invention in that the method of the type described by way of introduction has been given the characterising feature that the end roller, on the marshalling in a group, is moved downwards from a deflection point positioned at the upper part of the conveyor so that a part of the conveyor slants downwards.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings:

FIG. 1 shows an apparatus according to the present invention; and

FIGS. 2-5 schematically illustrate the function of the apparatus in different stages.

The accompanying Drawings show only the parts and details essential to an understanding of the present invention, and the positioning of the apparatus in its physical context has been omitted.

DESCRIPTION OF PREFERRED EMBODIMENT

FIG. 1 illustrates the apparatus with one, endless conveyor 1. The conveyor 1 has two end rollers 2, 3, so that the endless conveyor 1 forms an upper part 4 and a lower part 5. On the upper part 4 of the conveyor 1, objects 6 are advanced which are to be marshalled into groups. The objects 6 are advanced on one and the same conveyor 1 throughout the entire apparatus. The objects 6 are shown on the Drawings as parallelepipedic single-use disposable packages. The apparatus according to the present invention may be employed both for objects 6 and for packages of a different appearance. The apparatus is particularly suited for the marshalling into groups of objects 6 which have a high point of gravity and as a result may readily become unstable when they are advanced on a conveyor 1.

As shown in FIGS. 2-5, the conveyor 1 has at least one deflector roller 7 positioned on the under part 5 of the conveyor 1. In the preferred embodiment of the present invention, the conveyor has three deflector rollers 7, 8, 9 on the under part 5. One of the end rollers 2, 3 of the conveyor 1 or alternatively one of the deflector rollers 7, 8, 9 is driven by means of an electric motor 10 or the like. In the preferred embodiment of the present invention, the centremost deflector roller 8 is the one that is driven.

The apparatus also includes a stop plate 11 which is disposed to move up and down at 90° in relation to the conveyor 1. The stop plate 11 moves between an upper position where the objects 6 may pass under the stop plate 11 and a lower position where the stop plate 11 prevents the objects 6 from being displaced on the conveyor 1. The movement of the stop plate 11 is controlled by a pneumatic piston and cylinder assembly 12, or alternatively a hydraulic assembly or a servomotor. The stop plate 11 is positioned a distance from the one end roller 3 of the conveyor 1 so that an intended number of objects 6 may pass the stop plate 11.

At the one end roller 3 of the conveyor, there is disposed an end stop 13 which prevents the further movement of the objects 6 on the conveyor 1. The end stop 13 is, in the preferred embodiment, movable between a forward position, where the objects 6 arrive at the end stop 13, and a rear position which is used on the occasion of marshalling into groups. The movement of the end stop 13 is controlled by a pneumatic piston and cylinder assembly 14, or alternatively a hydraulic assembly or a servomotor. Alternatively, the end stop 13 may be fixed.

The conveyor 1 further has a deflection point 15 which is placed in association with the upper part 4 of the conveyor 1. The deflection point 15 is positioned at a distance from the one end roller 3 of the conveyor 1 so that an intended number of objects 6 may pass the deflection point 15. The deflection point 15 consists of a hinge or the like with rounded edges which abut against the lower side of the upper part 4 of the conveyor 1. The deflection point 15 is located approximately straight beneath the stop plate 11.

The apparatus also includes a pneumatic piston and cylinder assembly 16, or alternatively a hydraulic assembly or a servomotor, controlling the one end roller 3 of the conveyor 1. The end roller 3 may move from a position where the upper part 4 of the conveyor 1 is horizontal to a position where a part of the conveyor 1 slants downwards in relation to the horizontal plane. The slant of the conveyor 1 begins from the deflection point 15.

The objects 6 which are displaced on the conveyor 1 move in the direction of the arrow (see FIGS. 1-5). The objects 6 may be fed in on the conveyor 1 from another conveyor, by the intermediary of a plate 17, as shown in FIG. 1. Alternatively, the objects may enter onto the conveyor 1 from another conveyor in the direction of said conveyor 1. On the conveyor 1, the objects 6 may be arranged in one or more rows depending upon the desired packaging pattern for that distribution unit to which the objects 6 are to be marshalled.

The objects 6, which are shown as parallelepipedic single-use disposable packages, are advanced towards the end stop 13 (FIG. 2). The end stop 13 is located in its forward position and the entire conveyor 1 is horizontal, i.e. the end roller 3 is located in its upper position. The stop plate 11 is located in its upper position so that the objects 6 may pass freely.

When the intended number of objects 6 has passed the deflection point 15, the end roller 3 moves to its lower position (FIG. 3) and the conveyor 1 is slanted downwards from the deflection point 15. The slant is, in the preferred embodiment, 5-15°, depending upon the height of the objects 6. At the same time as the conveyor 1 is slanted, the end stop 13 moves to its rear position. The slant, together with the withdrawal of the end stop 13, create a sufficiently large gap between the marshalled and grouped section of objects 6 and the remaining rows of objects 6. The gap or space should be 20-25 mm in order to obtain a reliable marshalling into groups.

In that the objects 6 which are to be marshalled into a group does not pass any transition whatever at the occasion of being marshalled together, but move on a single conveyor 1, there will be obtained a rapid and reliable marshalling of the objects 6 into groups.

In this position, the stop plate 11 moves to its lower position (FIG. 4) so that the objects 6 which have not been marshalled into groups are stopped. The stop plate 11 can be controlled on its way down towards the conveyor 1 so that the stop plate 11 in the last part of the movement draws in towards the objects 6. This is an advantage when the stop plate 11 once again moves up to its upper position, since by such means friction against the objects 6 will be reduced. A reduction in friction against the objects 6 implies that the stop plate 11 does not run the risk of damaging the decorative artwork on the objects 6 when these consist of single-use disposable packages.

Figure 4:
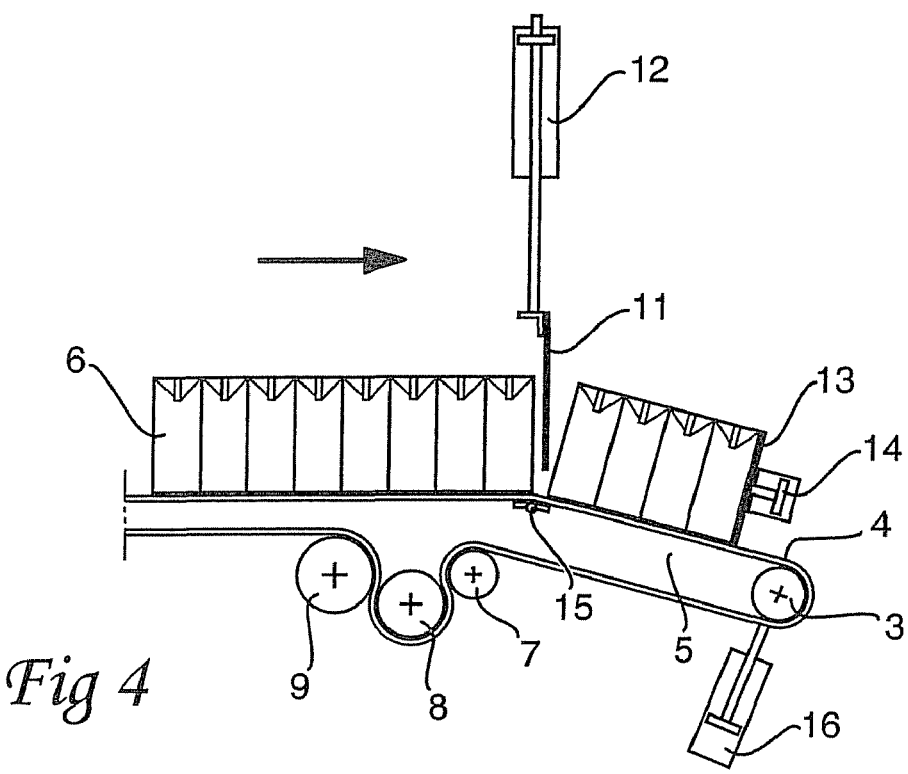
Figure 5:
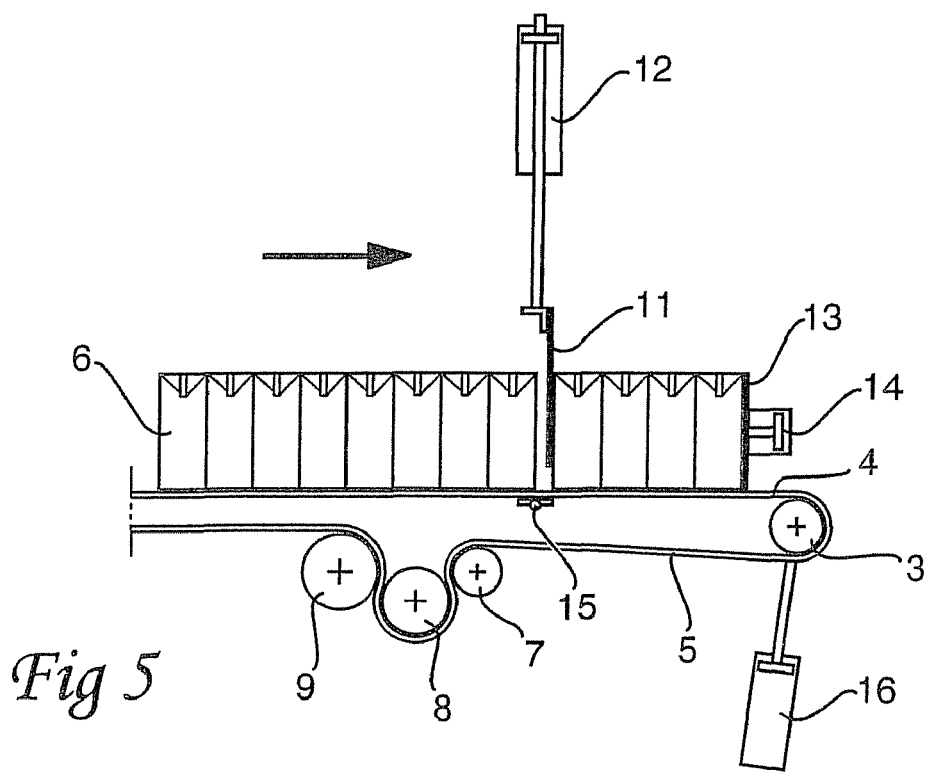

In FIG. 4, the marshalling of the intended number of objects 6 into a group is completed. The conveyor 1 is once again horizontal in that the end roller 3 has returned to its upper position. The marshalled objects 6 are located between the stop plate 11 and the end stop 13, and from this position they are moved by means of a pusher 18 at right angles out from the conveyor 1. The group of objects 6 receives support from the stop plate 11 and the end stop 13 when it is moved out from the apparatus. Once the objects 6 have been moved out from the conveyor 1 and the apparatus, they are moved further to other work stations where the group of objects 6 is surrounded by a paper tray, shrink film-wrapped or by other means combined to form a distribution unit. A marshalling cycle has now been completed and the apparatus is once again prepared to marshal a number of objects 6 into a group, according to FIGS. 2-5.

The conveyor 1 is disposed to be arrested during a short interval, when the conveyor 1 is slanted and the stop plate 11 moves down to its lower position. Alternatively, the conveyor may be driven throughout the entire marshalling process. In that the conveyor 1 is driven the objects 6 are stopped against the end stop 13, the objects 6 will be well packed together so that the group of objects 6 is united and thereby easier to move out of the apparatus.

The apparatus may be adapted for different sizes of objects 6 and different packing patterns. The upper position of the stop plate 11 may be adapted so that the stop plate only moves up so far that the objects 6 may pass beneath, i.e. the movement of the stop plate will be considerably less for lower objects 6. Different packing patterns can be set, in that the deflection point 15 is moved further out from or closer to the end stop 13.

As will have been apparent from the foregoing description, the present invention realises an apparatus for marshalling objects into groups, which are advanced on a conveyor. The apparatus permits a reliable and rapid marshalling, without the use of photocells or other detectors and without the objects being disrupted or stopped at any possible transitions between different conveyors.

What is claimed is:

1. An apparatus for marshalling objects into groups on a single, driven conveyor, the conveyor having two end rollers, and the apparatus including an end stop positioned at the one end roller, as well as a stop plate disposed to move up and down, at 90° in relation to the conveyor, wherein the conveyor has at least one deflector roller positioned at a lower part of the conveyor, a deflection point positioned at an upper part of the conveyor, wherein the one end roller is disposed to be displaced so that a part of the conveyor can be slanted downwards from the deflection point.

2. The apparatus as claimed in claim 1, wherein the slant is 5-15° in relation to a horizontal plane.

3. The apparatus as claimed in claim 1, wherein the end stop is disposed to move between a forward and a rear position.

4. The apparatus as claimed in claim 3, wherein the movements of the stop plate, the end roller and the end stop are realised each by a pneumatic piston and cylinder assembly.

5. A method of marshalling objects into groups on a single, driven conveyor, where the objects are advanced towards an end stop positioned at one end roller of the conveyor, whereafter a stop plate moves 90° down towards the conveyor and separates off a group of objects wherein the end roller on the marshalling into groups, is moved downwards from a deflection point positioned at an upper part of the conveyor, so that a part of the conveyor is slanted downwards.

6. The method as claimed in claim 5, wherein the conveyor is slanted 5-15° in relation to a horizontal plane.

7. The method as claimed in claim 5, wherein the end stop moves rearwards at the same time as the conveyor is slanted.

* * * * *